(12) United States Patent
Oppert et al.

(10) Patent No.: US 8,706,420 B2
(45) Date of Patent: Apr. 22, 2014

(54) SEISMIC FLUID PREDICTION VIA EXPANDED AVO ANOMALIES

(75) Inventors: Shauna K. Oppert, Houston, TX (US); Michael E. Farrell, Katy, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 171 days.

(21) Appl. No.: 12/933,033

(22) PCT Filed: Apr. 13, 2009

(86) PCT No.: PCT/US2009/040368
§ 371 (c)(1),
(2), (4) Date: Sep. 16, 2010

(87) PCT Pub. No.: WO2009/154851
PCT Pub. Date: Dec. 23, 2009

(65) Prior Publication Data
US 2011/0083844 A1    Apr. 14, 2011

Related U.S. Application Data

(60) Provisional application No. 61/132,352, filed on Jun. 18, 2008.

(51) Int. Cl.
*G01V 1/00* (2006.01)
*G01V 1/30* (2006.01)

(52) U.S. Cl.
CPC ....................................... *G01V 1/30* (2013.01)
USPC .......................................................... 702/14

(58) Field of Classification Search
CPC ....................................................... G01V 1/30
USPC .............. 702/11, 12, 13, 14; 716/15, 21, 928, 716/929; 367/47
See application file for complete search history.

(56) References Cited

U.S. PATENT DOCUMENTS

| | | | |
|---|---|---|---|
| 5,440,525 A | 8/1995 | Dey-Sarkar et al. | |
| 5,444,619 A | 8/1995 | Hoskins et al. | |
| 5,661,697 A * | 8/1997 | Swan et al. | 367/47 |
| 5,784,334 A * | 7/1998 | Sena et al. | 367/47 |
| 5,862,100 A * | 1/1999 | VerWest | 367/38 |
| 6,654,692 B1 * | 11/2003 | Neff | 702/11 |
| 6,751,558 B2 * | 6/2004 | Huffman et al. | 702/14 |
| 6,789,018 B1 * | 9/2004 | Khan | 702/2 |

(Continued)

OTHER PUBLICATIONS

Veeken, P. et al. (2006), "AVO attribute analysis and seismic reservoir characterization," First Break 24, pp. 41-52.*

(Continued)

*Primary Examiner* — John Breene
*Assistant Examiner* — Timothy H Hwang
(74) *Attorney, Agent, or Firm* — Exxonmobil Upstream Research Company Law Dept.

(57) ABSTRACT

A seismic fluid prediction data, e.g., a dataset, is generated for a subsurface region by preconditioning seismic data for amplitude-versus-offset (AVO) analysis. Seismic AVO attribute data is generated for the subsurface region, including creating intercept (A) and gradient (B) seismic data using two or more angle stacks of seismic data. Lithology prediction data is generated with the intercept (A) and gradient (B) seismic data, and an AVO crossplot for fluids is generated to identify an initial AVO anomaly. Seismic fluid prediction data is generated based on the generated AVO crossplot and lithology prediction data.

41 Claims, 7 Drawing Sheets

(56) References Cited

U.S. PATENT DOCUMENTS

| | | | |
|---|---|---|---|
| 7,095,677 B2* | 8/2006 | Canning | 367/47 |
| 7,343,245 B2 | 3/2008 | Young et al. | |
| 2004/0240321 A1* | 12/2004 | Canning | 367/47 |
| 2005/0001623 A1* | 1/2005 | Hanstein et al. | 324/336 |
| 2006/0004521 A1* | 1/2006 | Bankhead et al. | 702/14 |
| 2006/0081414 A1* | 4/2006 | Matherne et al. | 181/121 |
| 2006/0190180 A1* | 8/2006 | Cook | 702/14 |
| 2010/0270026 A1* | 10/2010 | Lazaratos et al. | 166/369 |

OTHER PUBLICATIONS

Barnes, A.E. (2007), "A tutorial on complex seismic trace analysis," *Geophysics* 72(6), pp. W33-W43.*

Chopra et al., "3D AVO crossplotting—An effective visualization technique" The Leading Edge; Nov. 2003; v. 22; No. 11; p. 1078-1089.*

Ewing, Thomas E., Synthetic Helps Spot the Target, Geophysical Corner, Jul. 1997.*

Harlan, William S., Preprocessing of Seismic Amplitudes, Presentation presented at 1994 SEG Annual Meeting Workshop on Seismic Amplitude Preservation, http://www.billharian.com/papers/Preprocessing_of_seismic_amplitudes.html.*

Aki, K. et al. (1980), "Quantitative Seismology: Theory and methods," W.G. Freeman and Co., pp. 153-154.

Feng, H. et al. (2007), "A comparison of hydrocarbon indicators derived from AVO analysis," *SEG Expanded Abstracts* 26, pp. 279-282.

Kelly, M.C. et al. (2005), "Quantitative AVO Analysis," *SEG Expanded Abstracts* 24, p. 273-277.

Oppert, S. et al. (2006), "Lithofacies Prediction in Clastic Deep Water Reservoirs," *SEG Expanded Abstracts* 25(1), pp. 1708-1711.

Smith et al. (1987), "Weighted Stacking for Rock Property Estimation and Detection of Gas," *Geophysical Prospecting* 35, pp. 993-1014.

Shuey, R.T. (1985), "A simplification of the Zoeppritz equations," *Geophysics* 50(4), pp. 609-614.

Zhou, Z. et al. (2007), "Is there a basis for all AVO attributes?," *SEG Expanded Abstracts* 66, p. 244-248.

Zoeppritz, K., "Seismic waves VIII B, on the reflection and propagation of seismic waves through unstable layers," Gottinger Nachrichten, pp. 66-84.

* cited by examiner

SEISMIC FLUID PREDICTION VIA EXPANDED AVO ANOMALIES

CROSS-REFERENCE TO RELATED APPLICATION

This application is the National Stage entry under 35 U.S.C. 371 of PCT/US2009/040368 that published as WO 2009/154851 and was filed on 13 Apr. 2009, which claims the benefit of U.S. Provisional Application No. 61/132,352, filed on 18 Jun. 2008, which is incorporated by reference, in its entirety, for all purposes.

TECHNICAL FIELD

This description relates generally to the field of geophysical exploration, resource development, and production planning Specifically, this description relates to techniques useful for interpreting resource volumes and connectivity, and/or for optimizing well locations. For example, seismic inversions for rock properties, such as lithology, porosity, and pore volume, can utilize the fluid prediction data to spatially identify fluids for transformation with varying equations.

BACKGROUND

In the oil and gas industry, seismic prospecting techniques commonly are used to aid in the search for and evaluation of subterranean hydrocarbon deposits. An exemplary seismic prospecting operation includes three stages: data acquisition, data processing, and data interpretation, and the success of the operation depends on satisfactory completion of the three stages. In the data acquisition stage, a seismic source is used to generate an acoustic signal that propagates into the earth and is at least partially reflected by subsurface seismic reflectors. The reflected signals are detected and recorded by an array of seismic receivers located at or near the surface of the earth, in an overlying body of water, or at known depths in boreholes. During the data processing stage, the recorded seismic signals, e.g., seismic amplitude response, are refined and enhanced using a variety of procedures that depend on the nature of the geologic structure being investigated and on the characteristics of the raw data. In general, the purpose of the data processing stage is to produce an image of the subsurface from the recorded seismic data for use during the data interpretation stage. The purpose of the data interpretation stage is to determine information about the subsurface geology of the earth from the processed seismic data. The results of the data interpretation stage may be used to determine the general geologic structure of a subsurface region, or to locate potential hydrocarbon reservoirs, or to guide the development of an already discovered reservoir.

The seismic amplitude response of a subsurface region containing sands is dependent upon both the rock properties and the pore fluid properties. Fluid prediction via amplitude versus offset (AVO) analysis is commonly used for risk reduction in the exploration, development and production of hydrocarbon resources. AVO analysis recognizes that the seismic reflection amplitude may vary with change in distance between the seismic source and receiver, where the offset is the distance between the seismic source and the receiver. Specifically, the variation in seismic reflection amplitude can be indicative of differences in lithology and fluid content in the subsurface rock layers. For example, AVO analysis may be used to determine thickness, porosity, density, velocity, lithology and fluid content of rock layers. A seismic reflection amplitude from a low-impedance, hydrocarbon-bearing sand typically increases with increasing offset distance. However, various rocks and fluids have different reflection amplitudes versus offsets indicative of the specific rock and fluid composition, e.g., various increasing amplitude with offset or decreasing amplitude with offset depending on the type of rock or fluid present. The accurate seismic prediction of fluids is used in resource exploration and can be used as a tool to aid in understanding the lithology and porosity of the rock.

Intercept-gradient crossplots derived from near and far angle-stack data allow for the identification of hydrocarbons that are separated from the wet sand or background shale response on seismic data. Crossplotting is a fundamental process for AVO analysis and has been widely documented to predict reservoir quality, including porosity, lithology, and fluid density. For example, one or more exemplary techniques of the background art which utilize crossplotting of seismic attributes to understand seismic response to hydrocarbons are further described in "A Comparison of Hydrocarbon Indicators Derived from AVO Analysis," SEG Expanded Abstracts 26, 279, by Feng et al., (2007); and in "Is There a Basis for All AVO Attributes?," SEG Expanded Abstracts 26, 244, by Zhou et al. (2007); "Quantitative AVO Analysis," SEG Expanded Abstracts 24, 273, by Kelly et al. (2005).

In a clastic regime, thick sands with a strong AVO response are generally easily identified using intercept-gradient crossplotting. However, the present inventors have determined that the vertical edges of thick sands typically display overlap in intercept-gradient space with wet sands or shales, and are consequently not identified using this crossplotting technique.

SUMMARY

In one or more of the following aspects, sand prediction techniques are incorporated with AVO techniques to predict hydrocarbon bearing sands that have seismic properties that overlap with wet-sand properties. The combined technique is particularly useful for predicting hydrocarbon-bearing sands in clastic rocks, but the technique can be modified for a variety of lithologies, e.g., a combination using limestone-dolomite prediction techniques and AVO techniques for carbonate regimes. The predicted fluid data can be used as a risk reduction tool for resource exploration, and/or as a development and production well-planning tool to better understand resource volumes and connectivity and for optimizing well locations. Seismic inversions for rock properties, such as lithology, porosity, and pore volume can utilize these data to spatially identify fluids for transformation with varying equations.

In one general aspect, a method for generating seismic fluid prediction data for a subsurface region includes preconditioning seismic data for amplitude-versus-offset (AVO) analysis. Seismic AVO attribute data for the subsurface region are generated, including creating intercept (A) and gradient (B) seismic data using two or more angle stacks of seismic data. Lithology prediction data with the intercept (A) and gradient (B) seismic data are generated. An AVO crossplot for fluids is generated to identify an initial AVO anomaly. Seismic fluid prediction data is generated based on the generated AVO crossplot and lithology prediction data.

Implementations of this aspect may include one or more of the following features. For example, seismic data representative of the subsurface region may be acquired as part of the method. Two or more angle-stacks of seismic data may be processed. Peconditioning seismic data may include spectral broadening the seismic data, and/or amplitude scaling the seismic data to fit an AVO model of interest. Preconditioning seismic data may include rotating the seismic data to quadrature phase. Preconditioning seismic data may include spectral shaping the seismic data, wherein spectral shaping the seismic data may include spectral shaping the seismic data to boost the low frequency content, including estimating a seismic wavelet of the seismic data, and/or applying a filter to move the amplitude spectrum of the seismic data to an earth model. Preconditioning seismic data may include amplitude scaling the seismic data for each angle stack to fit an AVO model of interest, and/or rotating the seismic data to quadrature phase. Amplitude scaling the seismic data for each angle stack may include generating a synthetic well-tie to the seismic data using an AVO model for each angle stack and scaling the seismic data to match synthetic amplitude for each angle stack. Preconditioning seismic data may include spectrally whitening the seismic data to equalize amplitudes of the seismic data at all frequencies. Spectrally whitening the seismic data may include estimating a seismic wavelet of the seismic data, and/or applying a filter to equalize amplitudes of the seismic data at all frequencies. Preconditioning seismic data may include integrating the spectrally whitened data along time domain or depth domain for each trace, and/or amplitude scaling the seismic data for each angle stack to fit an AVO model of interest. Preconditioning may include removing a background trend in amplitude from the integrated data by applying a filter to remove the background trend.

Generating AVO data may include formulating the intercept (A) and gradient (B) seismic data using a Shuey multiterm approximation, or Zoeppritz equations. Generating the AVO crossplot for fluids to highlight the initial AVO anomaly may include crossplotting the intercept (A) and gradient (B) seismic data at a well or other chosen hydrocarbon location within the subsurface region. The other chosen hydrocarbon location may include one or more seismic traces for analysis. A fluid line may be provided on the AVO crossplot, and data on the AVO crossplot may be designated as anomalous or non-anomalous features with respect to the fluid line. The fluid line may include one or more fluid lines separating anomalous and non-anomalous hydrocarbon bearing features from other hydrocarbon bearing features or non-hydrocarbon bearing features. The non-hydrocarbon bearing features may include wet sands and/or wet shales and the hydrocarbon bearing features may include hydrocarbon bearing sands. Generating the seismic fluid prediction data based on the generated AVO crossplot and lithology prediction data may include creating fluid prediction data comprising an initial seismic dataset including non-anomalous reference points of seismic data for the subsurface region. Each point of the seismic data may be analyzed, trace-by-trace, to determine if each point falls within an anomalous zone for a hydrocarbon bearing feature on the AVO crossplot. A hydrocarbon value for each point determined to fall within the anomalous zone may be assigned. The fluid prediction data may be extended along the seismic trace for each point determined to fall within the anomalous zone. Expanding the fluid prediction data may include identifying one or more hydrocarbon-water contacts with an individual time sample prior to creating the fluid prediction data, and inputting hydrocarbon-water contacts as horizons that limit the expansion of the fluid prediction data. Assigning the hydrocarbon value for each point and expanding the fluid prediction model may be iteratively performed in a forward and a reverse direction with respect to the seismic trace.

In another general aspect, a tangible computer-readable storage medium having embodied thereon a computer program configured to, when executed by a processor, for generating seismic fluid prediction data for a subsurface region, the medium comprising one or more code segments configured to precondition seismic data for amplitude-versus-offset (AVO) analysis; generate seismic AVO attribute data for the subsurface region, including creating intercept (A) and gradient (B) seismic data using two or more angle stacks of seismic data; generate lithology prediction data with the intercept (A) and gradient (B) seismic data; generate an AVO crossplot for fluids to identify an initial AVO anomaly; and generate seismic fluid prediction data based on the generated AVO crossplot and lithology prediction data.

Implementations of this aspect may include one or more of the following features. For example, one or more code segments may be configured to process two or more angle-stacks of seismic data. The one or more code segments configured to precondition seismic data may include one or more code segments configured to spectral broaden the seismic data; amplitude scale the seismic data to fit an AVO model of interest, and/or to rotate the seismic data to quadrature phase. The one or more code segments configured to precondition seismic data may include one or more code segments configured to spectral shape the seismic data, wherein spectral shaping the seismic data comprises spectral shaping the seismic data to boost the low frequency content, including estimating a seismic wavelet of the seismic data; and applying a filter to move the amplitude spectrum of the seismic data to an earth model. The one or more code segments configured to precondition seismic data may include one or more code segments configured to amplitude scale the seismic data for each angle stack to fit an AVO model of interest, and/or to rotate the seismic data to quadrature phase.

The one or more code segments configured to precondition seismic data may further include one or more code segments configured to spectrally whiten the seismic data to equalize amplitudes of the seismic data at all frequencies, wherein spectrally whitening the seismic data may include estimating a seismic wavelet of the seismic data; and applying a filter to equalize amplitudes of the seismic data at all frequencies. The spectrally whitened data may be integrated along time domain or depth domain for each trace, and/or the seismic data may be amplitude scaled for each angle stack to fit an AVO model of interest. The one or more code segments configured to generate the AVO crossplot for fluids to identify the initial AVO anomaly may include one or more code segments configured to crossplot the intercept (A) and gradient (B) seismic data at a well or other chosen hydrocarbon location within the subsurface region.

One or more code segments may be configured to provide a fluid line on the AVO crossplot, and/or to designate data on the AVO crossplot as anomalous or non-anomalous features with respect to the fluid line. The fluid line may include one or more fluid lines separating anomalous and non-anomalous hydrocarbon bearing features from other hydrocarbon bearing features or non-hydrocarbon bearing features. For example, the non-hydrocarbon bearing features may include wet sands and/or wet shales, and the hydrocarbon bearing features may include hydrocarbon bearing sands. The one or more code segments to generate the seismic fluid prediction data based on the generated AVO crossplot and lithology prediction data may include one or more code segments configured to create fluid prediction data comprising an initial seismic dataset including non-anomalous reference points of seismic data for the subsurface region, analyze each point of the seismic data, trace-by-trace, to determine if each point falls within an anomalous zone for a hydrocarbon bearing feature on the AVO crossplot, and/or to assign a hydrocarbon value for each point determined to fall within the anomalous zone; and expand the fluid prediction data along the seismic trace for each point determined to fall within the anomalous zone. The assignment of the hydrocarbon value for each point and the expansion of the fluid prediction model may be iteratively performed in a forward and/or a reverse direction with respect to the seismic trace. The fluid prediction data may be expanded by identifying one or more hydrocarbon-water contacts with an individual time sample prior to creating the fluid prediction data, and inputting hydrocarbon-water contacts as horizons that limit the expansion of the fluid prediction data.

In another general aspect, a method for producing hydrocarbons from a subsurface region includes generating seismic fluid prediction data for a subsurface region, wherein generating seismic fluid prediction data includes preconditioning seismic data for amplitude-versus-offset (AVO) analysis, generating seismic AVO attribute data for the subsurface region, including creating intercept (A) and gradient (B) seismic data using two or more angle stacks of seismic data, generating lithology prediction data with the intercept (A) and gradient (B) seismic data, generating an AVO crossplot for fluids to identify an initial AVO anomaly, and generating seismic fluid prediction data based on the generated AVO crossplot and lithology prediction data. Production of a hydrocarbon bearing asset is controlled within the subsurface region based on the seismic fluid prediction data. Hydrocarbons are produced from the hydrocarbon bearing asset. Production of the hydrocarbon bearing asset may include optimizing well location and/or well production. The seismic fluid prediction data may be inverted to determine rock properties and spatially identifying fluids for transformation with one or more equations based on the inverted data.

DETAILED DESCRIPTION

One or more of the following techniques described hereinafter incorporate intercept-gradient crossplots and AVO data used for lithology identification to expand the prediction of hydrocarbon-bearing geologic units having AVO properties that overlap with non-hydrocarbon bearing geologic units. Although the exemplary techniques are not limited to clastic environments, the hydrocarbon-bearing geologic units of reference may be, for instance, oil or gas sands, and the non-hydrocarbon bearing geologic units may be wet sands or shales. Accordingly, the following embodiments refer to one or more examples of these geologic units found in an exemplary clastic environment for ease and simplicity of the discussion of the various embodiments, but should not be construed as being limited to only these geologic units.

Figure 1:
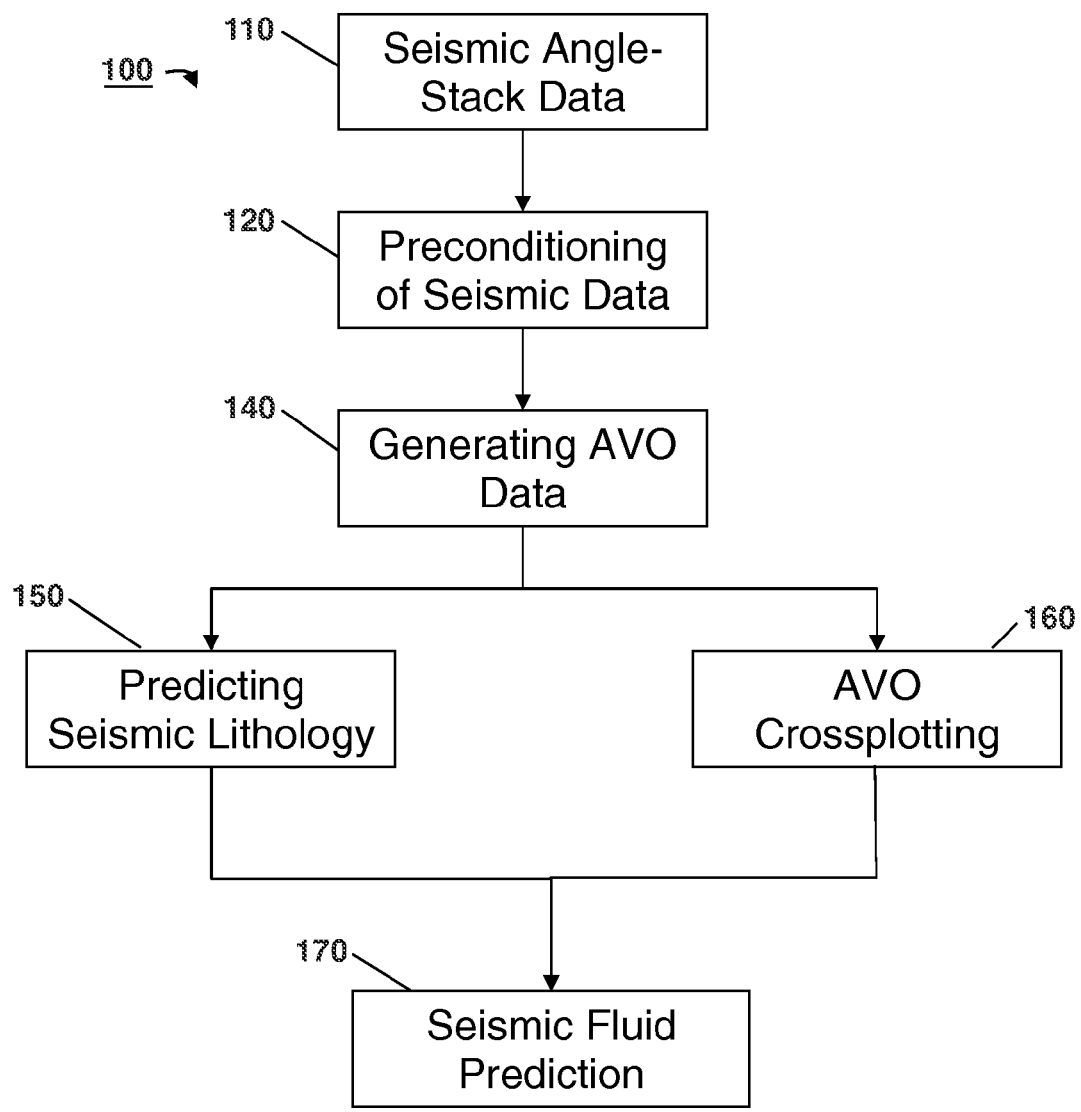
FIG. 1 is a flowchart of an exemplary process for generating seismic fluid-prediction data.

FIG. 1 is a flowchart of an exemplary process 100 for generating seismic fluid-prediction data. Referring to FIG. 1, in step 110, seismic data is collected and two or more angle-stacks of seismic data are processed using appropriate seismic processing software program stored within a data processing and/or interpretation system, wherein seismic data from common ranges of angles of incidence are combined into a composite record or "angle-stack". In step 120, the seismic data is preconditioned for AVO analysis prior to creating the lithology or fluid prediction data. In step 140, the AVO data is generated, e.g., the intercept (A) and gradient (B) seismic data are created using the two or more angle stacks of seismic data. Ideally, the A and B seismic data are calculated using an approximation of the Zoeppritz equations as specified in the publication "Seismic Waves VIII B, On the reflection and propagation of seismic waves through unstable layers," Gottinger Nachrichten, 66-84 by K. Zoeppritz. Because the Zoeppritz equations are highly nonlinear with respect to velocities and density, many approximations have been made in order to linearize them. In the publication, "Quantitative Seismology: Theory and methods," W.G. Freeman and Co., New York (1980), the authors K. Aki and P. G. Richards simplify the equations by assuming small contrasts between layers. The publication "A Simplification of the Zoeppritz Equations," Geophysics, 50, 609-614, by Shuey, R. T., (1985) describes an exemplary approximation technique that is easily utilized for the creation of A and B seismic data. Smith et al. describe weighted-stack methods in the publication "Weighted Stacking for Rock Property Estimation and Detection of Gas," Geophysical Prospecting, 35, 993-1014 (1987). In a preferred implementation of process 100, a Shuey (1985) 2-term approximation to the Zoeppritz equations is used to create the intercept (A) and gradient (B) seismic data, formulated in the weighted-stack methods of Smith and Gidlow (1987), where each angle stack of seismic data is represented by $R(\theta_j)$, and $\theta_j$ is the average incident angle for the angle stack.

Specifically, each angle stack is represented by the equation:

$$R(\theta_j) = A_j + B_j \sin^2\theta_j,  \quad \text{Equation 1}$$

and together each of the angle-stacks are represented in matrix form by the equation:

$$R = Wm, \quad \text{Equation 2}$$

where W is the linear operator matrix $[1 \; \sin^2\theta_1; \; 1 \; \sin^2\theta_2; \; \ldots ; \; 1 \; \sin^2\theta_P]$, for P number of angle stacks, and $m = [A_1 \; A_2 \ldots A_P; \; B_1 \; B_2 \ldots B_P]$. We can calculate intercept and gradient by solving this equation. A least-squares weighted solution to this equation for intercept and gradient is:

$$m = [W^H W + \mu I]^{-1} W^H R,$$

where $W^H$ is the conjugate or transpose of operator W, $\mu$ is a weighting value, and I is the identity matrix. Each angle stack is represented in the R reflectivity matrix in this formulation for A and B. The intercept and gradient may alternatively be formulated given the Zoeppritz equations, the Shuey 3-term, the Aki-Richards equations, or another approximation to the Zoeppritz equations.

In step 150, seismic lithology is predicted, and AVO is crossplotted in step 160. For example, in step 150, lithology prediction data is generated using the seismic AVO attribute data, A and B. In step 160, the AVO crossplot for fluids is generated to highlight an initial AVO anomaly. In step 170, the AVO crossplot for fluids and lithology prediction data are used to generate seismic fluid prediction data. The seismic fluid prediction data has multiple applications, including, but not limited to: de-risking potential hydrocarbon plays, understanding reservoir connectivity, optimizing well locations, and seismic inversion for reservoir properties such as porosity and clay content. Seismic fluid prediction may be applied to a one, two, three, or four dimensional volume of seismic data, where the dimensions may be spatial (x or y) or temporal (time or depth).

Figure 2:
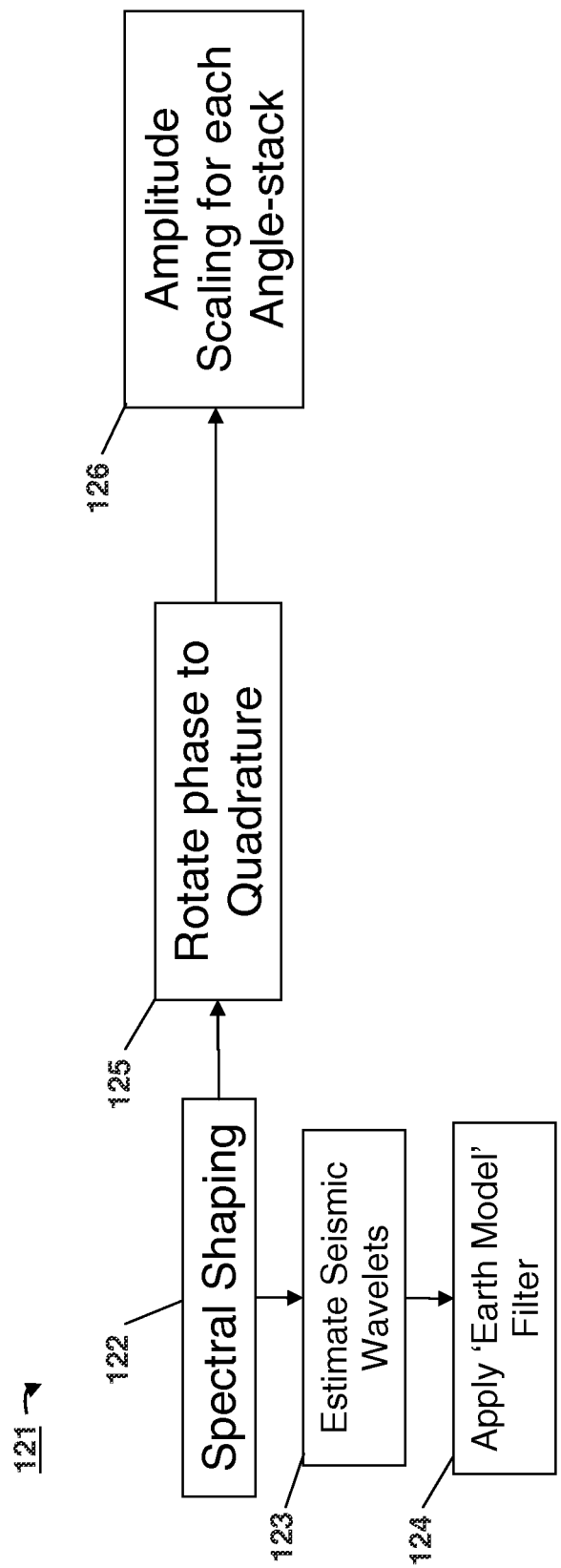
FIG. 2 is a flowchart of an exemplary process for preconditioning seismic data that may be incorporated into the process of FIG. 1.
Figure 3:
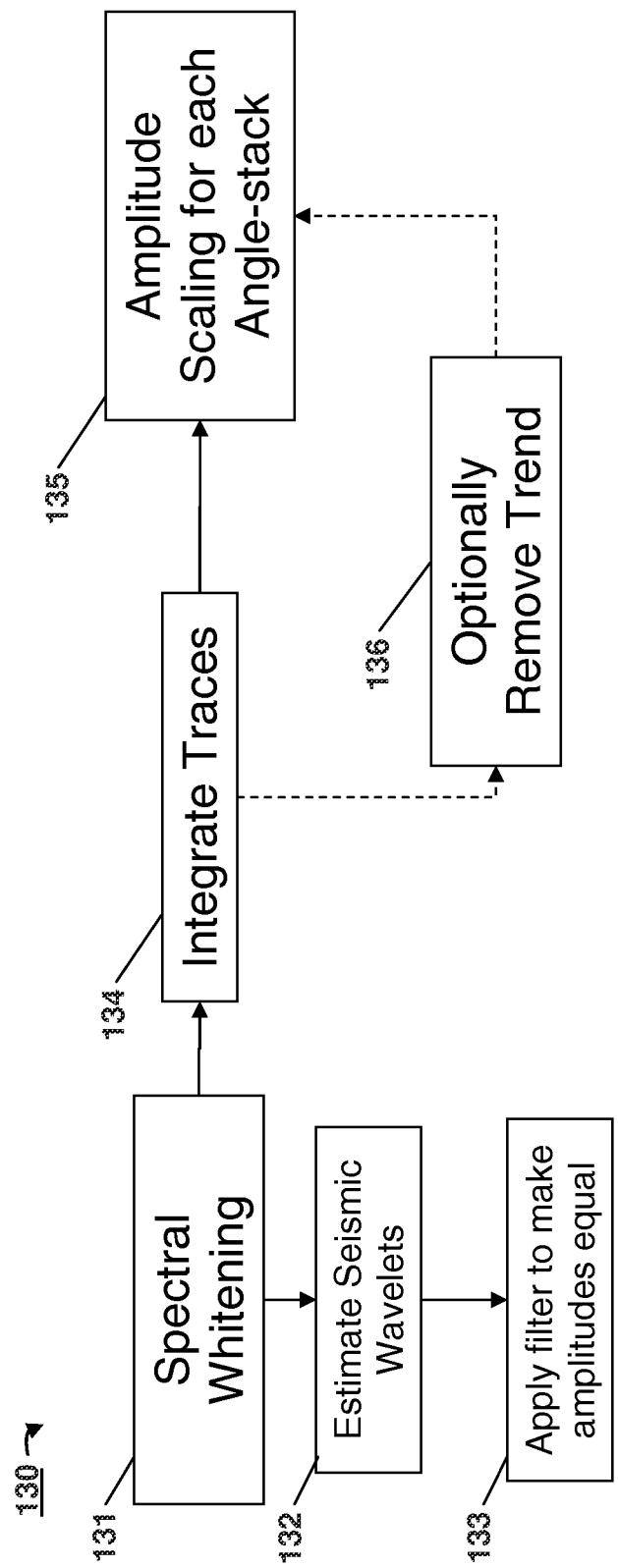
FIG. 3 is a flowchart of an alternative, exemplary process for preconditioning seismic data that may be incorporated into the process of FIG. 1.

FIG. 2 is a flowchart of an exemplary process 121 for preconditioning seismic data that may be incorporated into the process of FIG. 1. FIG. 3 is a flowchart of an alternative, exemplary process 130 for preconditioning seismic data that may be incorporated into the process of FIG. 1. Referring to FIGS. 2 and 3, preconditioning 120 generally includes spectral broadening, amplitude scaling, and rotation of phase for each angle-stack seismic dataset available. For example, referring to FIG. 2, in the first exemplary preconditioning process 121, the seismic data is first spectrally shaped 122 to boost low frequency content, and then the amplitudes are scaled for each angle-stack 126 to fit the AVO model of interest. The data is rotated to quadrature phase 125, a step that may be done before or after scaling as it is a linear function. The spectral shaping 122 of the data generally involves estimating the wavelet of the seismic data 123 and applying a filter 124 to move the amplitude spectrum of the seismic data 123 toward an earth model. The amplitude scaling 126 can be applied in several ways. If well data is available, a synthetic well-tie to the seismic data is generated using the appropriate AVO model for each angle stack, and the seismic data is scaled to match the synthetic amplitude for each angle stack. For example, the AVO models may include one or more exemplary AVO modeling techniques: Zoeppritz equations, Aki-Richards Equations, or Shuey's approximations. In lieu of well data, an appropriate guess of amplitude scaling may be used at this point, although it may be necessary to rescale the data at a later point in the process based on the results of crossplotting.

Referring to FIG. 3, in another preconditioning process 130, the seismic data is first spectrally whitened 131. The spectral whitening may include estimating a seismic wavelet 132 of the seismic data, and/or applying a filter to equalize amplitudes 133 of the seismic data at all frequencies. The whitened data is then integrated along the time or depth domain 134, e.g., for each trace. If the integration step 134 creates a strong background trend in amplitude, a simple polynomial or linear filter may be designed to remove the trend from the data, e.g., optional step 136. Like the previous preconditioning approach of process 121, the amplitudes of the spectrally-whitened, integrated-trace data are also scaled 135 to fit the appropriate AVO model.

In step 150 in FIG. 1, lithology prediction data, L(t), is generated using the seismic AVO attribute data, A and B. If well data is present, the angle-stack seismic data may be used in a linear or nonlinear combination with the A and B data to generate an empirically driven calculation of predicted lithology. In many clastic reservoirs, an A+B dataset or some close modification, e.g., A+2B or −A−B, may be appropriate to identify lithology. For example, the publication "Lithofacies Prediction in Clastic Deep Water Reservoirs," SEG, Expanded Abstracts, 25, no. 1, 1708-1711, by Oppert et al. (2006) describes an exemplary A+B dataset.

Figure 4:
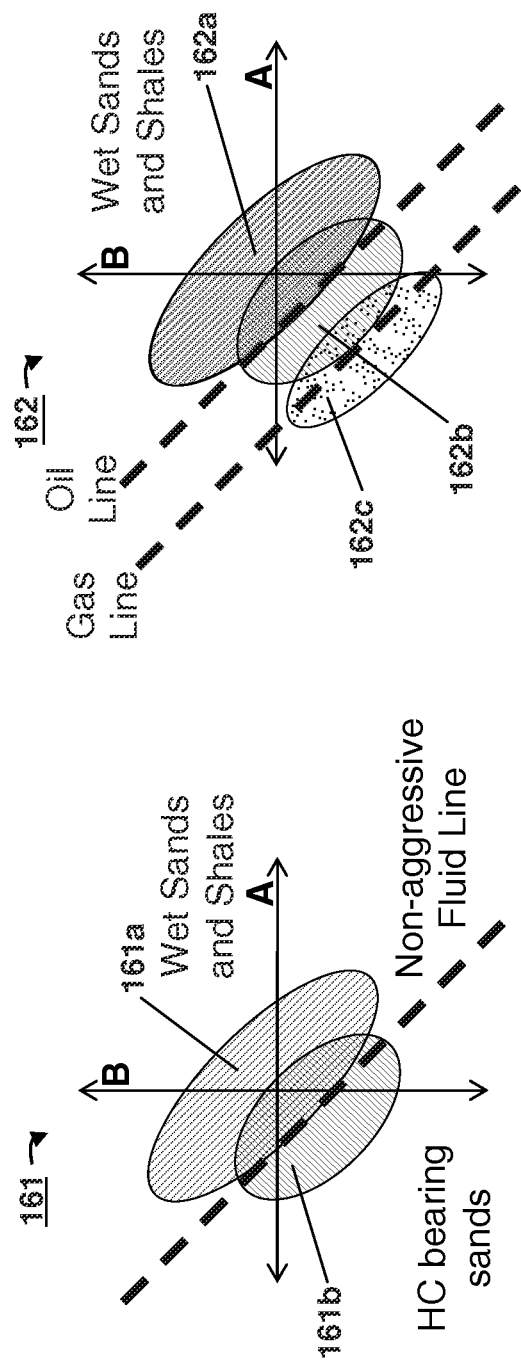
FIG. 4 is a graphical view of an exemplary technique for identifying anomalous hydrocarbon zones using the fluid lines on AVO crossplots.
Figure 5:
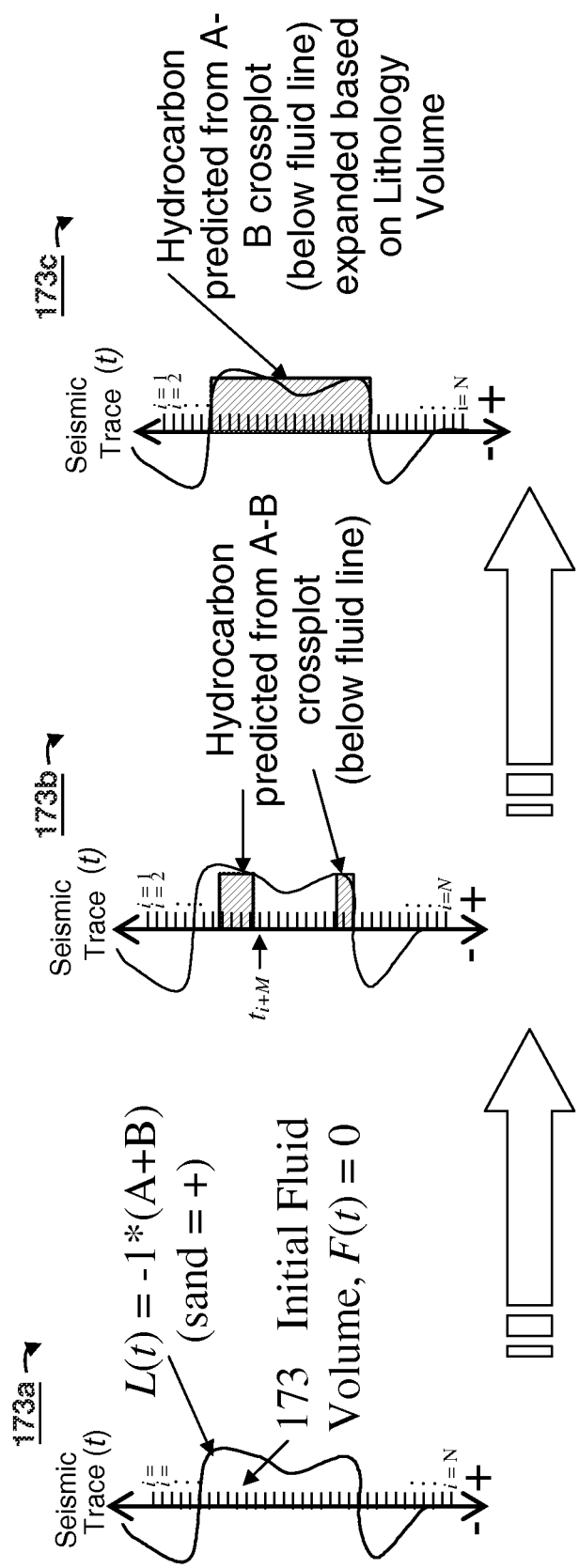
FIG. 5 is a graphical view of an exemplary technique for expanding anomalous fluid predictions from A–B crossplots using lithology prediction data.
Figure 6:
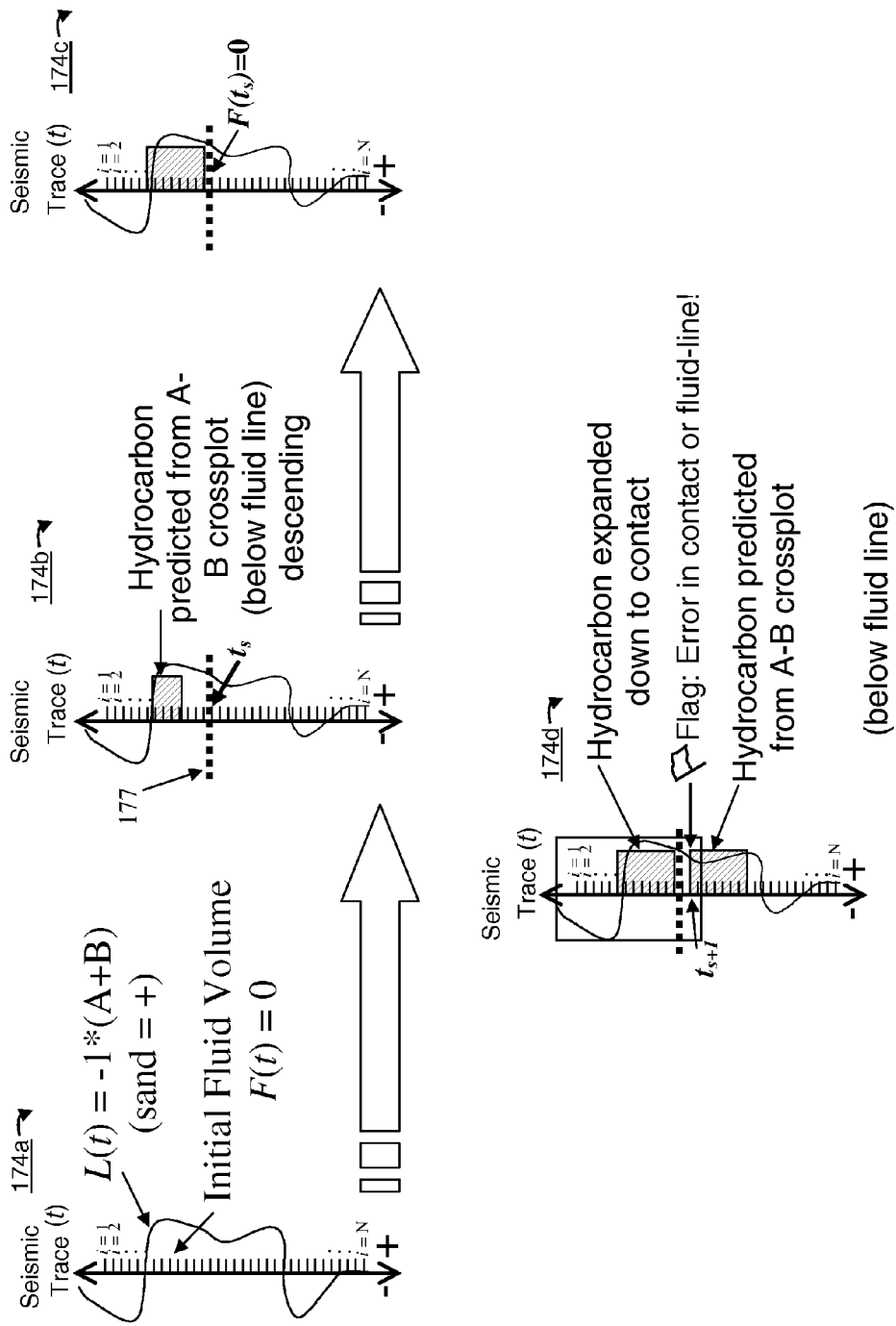
FIG. 6 is a graphical view of an exemplary technique for expanding anomalous fluid predictions from A–B crossplots using lithology prediction data and an interpreted hydrocarbon-water contact.

FIG. 4 is a graphical view of an exemplary technique for identifying anomalous hydrocarbon zones using the fluid lines on AVO crossplots. FIG. 5 is a graphical view of an exemplary technique for expanding anomalous fluid predictions from A−B crossplots using the lithology prediction data 150. FIG. 6 is a graphical view of an exemplary technique for expanding anomalous fluid predictions from A−B crossplots using the lithology prediction data 150 and an interpreted hydrocarbon-water contact.

For example, an exemplary method for generating seismic fluid prediction data for a subsurface region includes preconditioning seismic data for amplitude-versus-offset (AVO) analysis. Seismic AVO attribute data for the subsurface region is generated, including creating intercept (A) and gradient (B) seismic data using two or more angle stacks of seismic data. Lithology prediction data with the intercept (A) and gradient (B) seismic data is generated. An AVO crossplot for fluids is generated to identify an initial AVO anomaly. Seismic fluid prediction data is generated based on the generated AVO crossplot and lithology prediction data.

Referring to FIGS. 1 and FIGS. 4-6, the AVO crossplot for fluids is generated in step 160 to highlight an initial AVO anomaly. Referring to FIG. 4, the A and B data are crossplotted at the well, or a chosen hydrocarbon location, on plot 161. The chosen location may include one or multiple seismic traces for analysis. The initial hydrocarbon prediction is created by choosing a non-aggressive fluid line in A−B space that separates anomalous oil or gas sands, e.g., hydrocarbon bearing sands 161b from non-anomalous wet sands and shales, wet sands and shales region 161a shown on plot 161. The data that fall below the non-aggressive fluid line in plot 161 are deemed anomalous AVO features, e.g., portion of 161b to the left-side of the non-aggressive fluid line in plot 161, and the data above the fluid line are not anomalous, e.g., wet sands and shales region 161a and portion of 161b to the right side of the non-aggressive fluid line.

The anomalous AVO features are used to identify strong, thick anomalous hydrocarbon-bearing sands. Typically, the anomalous sands highlighted have vertical edges that are not identified because these data fall in the non-anomalous zone on the A−B crossplot. In plot 162, an oil line and a gas line are utilized to separate a wet sands and shales region 162a (non-anomalous region to the right of the oil line), an oil bearing sands region 162b with an anomalous region falling between the oil and gas lines and a non-anomalous region falling to the right of the oil line, and a gas bearing sands region 162c with an anomalous region (with respect to oil) to the left of the gas line and a non-anomalous region to the right of the gas line.

Figure 7:
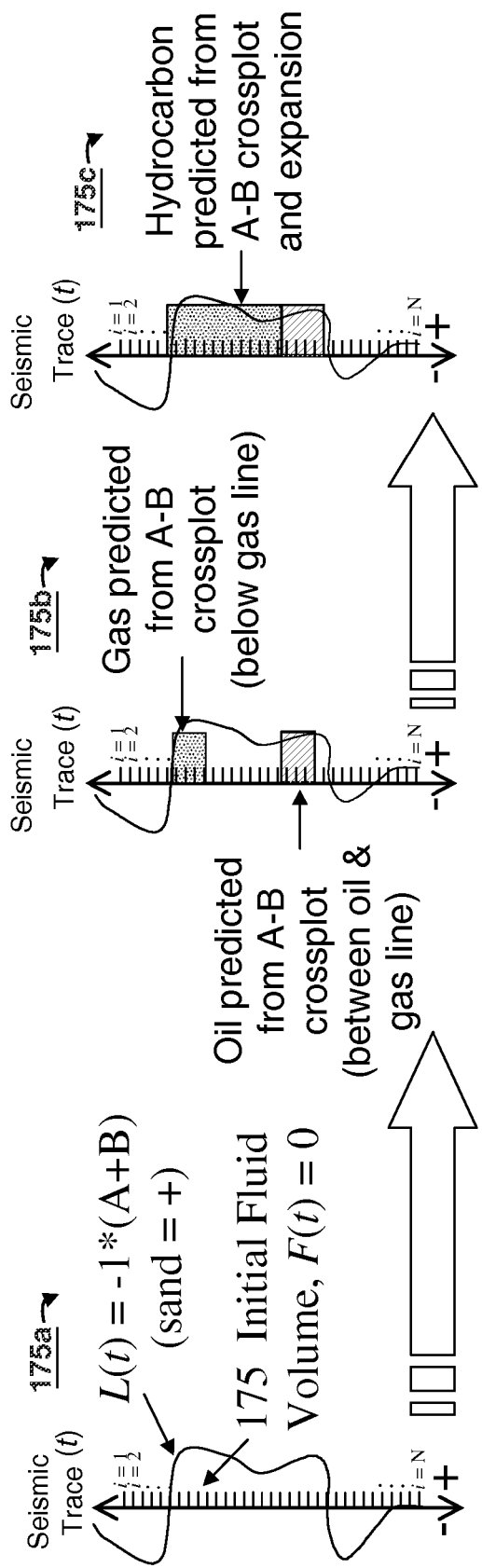
FIG. 7 is a graphical view of an exemplary technique for expanding anomalous fluid predictions with multiple types of hydrocarbon cases from A–B crossplots using lithology prediction data.

Referring to FIG. 5, e.g., step 170 where the seismic fluid prediction data is generated, the lithology prediction data (L(t) in FIGS. 5-7) is next used to expand the crossplot prediction from step 160 to the vertical extent of the anomalous sands. For example, the technique shown in FIG. 5 is a trace-by-trace operation 173a-173c that searches for anomalous hydrocarbon predictions deemed by the A−B crossplot, and expands this prediction to the edges of the anomaly, designated by the lithology prediction data. The technique is applied along the time or depth domain of the seismic trace t, where the trace is referenced by time sample $i=1, 2, 3, \ldots, N$, and N is the last time sample. A second iteration of the expansion is applied along the reverse direction of the time or depth domain for each trace, t. In step 173a, the technique begins by creating the fluid prediction dataset 173, F(t), initially an empty seismic dataset consisting of non-anomalous reference points, i.e., negative hydrocarbon values or zeros, of the size of the original seismic data of interest (F(t)=0, initially). The fluid prediction is completed by progressing from step 173a to 173b to 173c shown in FIG. 5.

In step 173b, each point of the seismic data ($t_i$) is analyzed to understand whether it falls into the anomalous zone on the A–B crossplot. If the point $t_i$ does not fall into the anomalous zone, then the fluid prediction data, $F(t_i)$, remains a negative hydrocarbon value for this referenced point ($F(t_i)=0$), and the process continues searching for a point that falls within the anomalous zone on the A–B crossplot. If the point $t_i$ does fall into the anomalous zone, then the fluid prediction data, $F(t_i)$, is assigned a positive hydrocarbon value for this referenced point ($F(t_i)=1$). The following data point, $t_{i+1}$, is then analyzed to understand if it is also anomalous. If it is anomalous, then the fluid prediction data is assigned a positive hydrocarbon value for this referenced point ($F(t_{i+1})=1$). The method continues to search along the trace assigning positive hydrocarbon values to the fluid prediction data in the same fashion, until a non-anomalous data point is found, which referred to as $t_{i+M}$. The method references the same time or depth location within the lithology prediction data (L(t)) to understand if it remains within the same sand region of the anomalous zone. If $L(t_{i+M})$ is the same lithology as predicted at $L(t_{i+M-1})$, then the fluid prediction data is assigned a positive hydrocarbon value for this referenced point $L(t_{i+M})$, and the next point $L(t_{i+M+1})$ is now analyzed for a lithology change. The process continues to populate the F(t) fluid prediction data with positive hydrocarbon values until a change in the lithology occurs in L(t), where it does not assign a positive hydrocarbon value, but instead, automatically moves to the next sample $t_i$ on the A–B crossplot to analyze whether it falls into the anomalous hydrocarbon zone.

In step 173c, once the process advances to $t_N$, the second iteration in the reverse direction is applied following the same rules. In step 173b, hydrocarbons are predicted from the A–B crossplot (below fluid line), and in step 173c, hydrocarbons are predicted from A–B crossplot (below fluid line) and then expanded based on the lithology prediction data. This process generally works well for sands that are at or above tuning thickness and have little structural relief on the seismic data. Thin sands that are below tuning thickness are generally not recognized as an anomalous feature on the A–B crossplot and should be identified using alternative methods. The presence of structural relief may be problematic for this method locally at hydrocarbon-water contacts. An interpreted hydrocarbon-water contact modification is used to manually steer the prediction of hydrocarbons in these areas.

FIG. 6 is a graphical view of an exemplary technique for expanding anomalous fluid predictions from A–B crossplots using lithology prediction data and an interpreted hydrocarbon-water contact 177. Referring to FIG. 6, hydrocarbon-water contacts can be input to the process as horizons that limit the vertical descent of the expansion, as in technique 174a-174d. In step 174a, one or more hydrocarbon-water contacts are defined prior to initiation of the fluid prediction method, each having a given time sample location ($t_S$) for each trace. In step 174b, when the fluid prediction method reaches the time sample $t_S$, the fluid prediction is deemed a non-hydrocarbon response, and the fluid prediction data is set to be zero ($F(t_S)=0$), as in, step 174c. The method continues searching down the trace for the next anomalous hydrocarbon response in the A–B crossplot. In step 174d, if the next anomalous hydrocarbon response is the very next time sample, $t_{S+1}$, then a flag is displayed for the user to help identify an error in the hydrocarbon-water contact or an error in the fluid-line picked to identify anomalous hydrocarbon events on the A–B crossplot. The hydrocarbon-water contact modification is only applied in the vertical descending direction. A second iteration in the reverse direction is applied without the described hydrocarbon-water contact modification. In step 174d, hydrocarbons are predicted from the A–B crossplot (below fluid line) in the reverse direction.

A number of embodiments have been described. Nevertheless, it should be understood that various modifications may be made without departing from the spirit and scope of the claims. For example, although the foregoing implementations have described an exemplary technique for expanding anomalous fluid predictions from A–B crossplots using lithology prediction data and an interpreted hydrocarbon-water contact, e.g., based on non-aggressive fluid line plot 161 in FIG. 4, the same or similar techniques may be applied to anomalous fluid predictions involving gas bearing sands, oil bearing sands and wet sands and shales, e.g., based on gas line and oil line plot 162 in FIG. 4.

For example, FIG. 7 is a graphical view of an exemplary technique for expanding anomalous fluid predictions with multiple hydrocarbon cases from A–B crossplots using lithology prediction data, e.g., using crossplot 162 in FIG. 4. Referring to FIG. 7, another modification to the method includes allowing for multiple fluids to be identified using this method. In step 175a, we allow for a variation of the method to account for the case that the seismic has both the response of gas and oil present and a separation between these responses can be identified using the AVO attributes. Referring to FIG. 4 and FIG. 7, the variation requires a separate zone for each of the anomalous hydrocarbon zones on the A–B crossplot. When searching through each time sample as in 175b, the process recognizes which hydrocarbon zone was being identified on the A–B crossplot, and perpetuate an anomalous hydrocarbon response vertically downward in the fluid prediction data, until a sand was not found on the lithology prediction data. In step 175b, the user has the option to only perpetuate oil downward and likewise to only perpetuate gas upwards. Alternatively, the fluids can be assigned based on the observed changes in the AVO crossplot zones. For example, in step 175b, if the A–B crossplot and lilthology prediction data indicate a gas sand was observed at $t_g$, a non-anomalous sand at $t_{g+1}$, and an oil sand at $t_{g+2}$, then the fluid prediction data identifies a gas sand at both locations $F(t_g)$ and $F(t_{g+1})$ and an oil sand at $F(t_{g+2})$. In step 175c, the anomalous fluid predictions are expanded using the lithology prediction data, e.g., in the example shown the gas sands prediction is expanded to the oil sands prediction.

Although the exemplary processes shown in FIGS. 1-7 are shown in sequential flow charts, one or more of the process steps for the exemplary processes may be performed in parallel or in a different order. For example, referring to FIG. 2, in the first exemplary preconditioning process 121, the seismic data is spectrally shaped 122 to boost low frequency content, and the amplitudes are scaled for each angle-stack 126 to fit the AVO model of interest. Although the data is rotated to quadrature phase 125, the data may be rotated to quadrature phase 125 before or after scaling as it is a linear function.

Reservoir properties have typically been predicted from seismic data by various techniques in the background art. For example, U.S. Pat. No. 5,444,619 describes the prediction of reservoir properties using Artificial Neural Networks (ANN). However, the present inventive techniques do not utilize trained ANN for predicting reservoir properties. U.S. Patent Publication No. 2006/0282220 describes a method using seismic and AVO analysis to extract information relating to lithology, porosity, and fluids. The described method appears to utilize distances between a reference point and the subjective AVO data points to classify data points based on lithology, fluid or porosity. In contrast, the present inventive techniques do not incorporate distances between a given reference point to classify reservoir properties. U.S. Pat. No. 5,440,525 describes a method for predicting hydrocarbons based on seismic data using AVO attributes. However, the described methods appear to stem from using deviations from a regression line of data plotted on AVO crossplots from Normal-Moveout corrected Common Mid-Point (CMP) gathers. In contrast, the present inventive techniques differ as pre-processed seismic angle-stack, quadrature data is used to create AVO crossplots. Further, hydrocarbon indicator values are not assigned based on the deviation of a data point from a regression line.

One or more of the aforementioned processes and/or techniques to generate seismic fluid prediction data, e.g., the processes generally shown and described in connection with FIGS. 1-7, can be implemented in digital electronic circuitry, or in computer hardware, firmware, software, or in any combination thereof. Any of the aforementioned functionality may be implemented as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

One or more process steps of the aforementioned embodiments can be performed by one or more programmable processors executing a computer program to perform functions of the aforementioned embodiments by operating on input data and generating output, for example, a software application residing within memory of one or more client devices or server(s) within a data processing and/or interpretation network. A user may interact with the software application through one or more user and data input and output interfaces, e.g., keyboard, monitor, printer, and/or cursor control device. One or more steps can also be performed by, and an apparatus or system can be implemented as, special purpose logic circuitry, e.g., an FPGA (field programmable gate array) or an ASIC (application-specific integrated circuit). In addition, data acquisition and display may be implemented through a dedicated data collection and/or processing system, e.g., containing data acquisition hardware, such as hydrophones and/or geophones, a processor(s), and various user and data input and output interfaces, such as a display component for graphically displaying one or more of the simulations and/or calculated transport properties obtained through any of the aforementioned process steps or processes.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto-optical disks; and CD-ROM (compact disk read-only memory) and DVD-ROM (digital versatile disk read-only memory) disks. The processor and the memory can be supplemented by, or incorporated in special purpose logic circuitry.

For example, an exemplary data processing and interpretation system may include a memory having a computer program embodied thereon for generating seismic fluid prediction data for a subsurface region. The memory and/or the computer program include one or more code segments configured to precondition seismic data for amplitude-versus-offset (AVO) analysis, to generate seismic AVO attribute data for the subsurface region, including creating intercept (A) and gradient (B) seismic data using two or more angle stacks of seismic data, to generate lithology prediction data with the intercept (A) and gradient (B) seismic data, to generate an AVO crossplot for fluids to identify an initial AVO anomaly, and/or to generate seismic fluid prediction data based on the generated AVO crossplot and lithology prediction data. A processor is configured to execute the computer program, and one or more user and/or data input and/or output devices are operatively connected to the system.

An exemplary method for producing hydrocarbons from a subsurface region may include generating seismic fluid prediction data for a subsurface region, wherein generating seismic fluid prediction data includes preconditioning seismic data for amplitude-versus-offset (AVO) analysis; generating seismic AVO attribute data for the subsurface region, including creating intercept (A) and gradient (B) seismic data using two or more angle stacks of seismic data; generating lithology prediction data with the intercept (A) and gradient (B) seismic data; generating an AVO crossplot for fluids to identify an initial AVO anomaly; and generating seismic fluid prediction data based on the generated AVO crossplot and lithology prediction data. The drilling, development, and/or production of a hydrocarbon bearing asset may be controlled within the subsurface region based on the seismic fluid prediction data. Hydrocarbons may be produced from the hydrocarbon bearing asset. Controlling production of the hydrocarbon bearing asset may include optimizing well location or well production. The seismic fluid prediction data may be inverted to determine rock properties, such as lithology, porosity, and pore volume, and the data may be utilized to spatially identify fluids for transformation with varying equations.

All such modifications and variations are intended to be within the scope of the appended claims. Persons skilled in the art will also readily recognize that in preferred embodiments, at least some of the steps are performed on a computer, e.g., the exemplary processes may be computer implemented. In such cases, the resulting model parameters may either be downloaded or saved to computer memory.

We claim:

1. A method for generating seismic fluid prediction data for a subsurface region, comprising:
   obtaining seismic data representative of the subsurface region;
   preconditioning the seismic data for amplitude-versus-offset (AVO) analysis, using a computer;
   generating, using the computer, seismic AVO attribute data for the subsurface region, including creating intercept (A) and gradient (B) seismic data using two or more angle stacks of the preconditioned seismic data;
generating, using the computer, lithology prediction data with the two or more angle stacks of seismic data or with the intercept (A) and gradient (B) seismic data;
generating, using the computer, an AVO crossplot for fluids to identify an initial AVO anomaly; and
expanding the initial AVO anomaly using the lithology prediction data, thereby generating seismic fluid prediction data for the subsurface region; wherein expanding the initial AVO anomaly using the lithology prediction data comprises reversing a negative fluid prediction based on the initial AVO anomaly for a point indicated by the lithology prediction data to belong to the same lithology as a point having a positive fluid prediction.

2. The method of claim 1, wherein preconditioning seismic data comprises:
spectral broadening the seismic data; and
amplitude scaling the seismic data to fit an AVO model of interest.

3. The method of claim 2, wherein preconditioning seismic data further comprises rotating the seismic data to quadrature phase.

4. The method of claim 1, wherein preconditioning seismic data further comprises spectral shaping the seismic data.

5. The method of claim 4, wherein spectral shaping the seismic data comprises spectral shaping the seismic data to boost low frequency content, including:
estimating a seismic wavelet of the seismic data; and
applying a filter to move an amplitude spectrum of the seismic data to an earth model.

6. The method of claim 4, wherein preconditioning seismic data further comprises:
amplitude scaling the seismic data for each angle stack to fit an AVO model of interest; and
rotating the seismic data to quadrature phase.

7. The method of claim 6, wherein amplitude scaling the seismic data for each angle stack comprises generating a synthetic well-tie to the seismic data using an AVO model for each angle stack and scaling the seismic data to match synthetic amplitude for each angle stack.

8. The method of claim 1, wherein preconditioning seismic data further comprises spectrally whitening the seismic data to equalize amplitudes of the seismic data at all frequencies of the seismic data.

9. The method of claim 8, wherein spectrally whitening the seismic data comprises:
estimating a seismic wavelet of the seismic data; and
applying a filter to equalize amplitudes of the seismic data at all frequencies of the seismic data.

10. The method of claim 8, wherein preconditioning seismic data further comprises:
integrating the spectrally whitened data along time domain or depth domain for each trace; and
amplitude scaling the seismic data for each angle stack to fit an AVO model of interest.

11. The method of claim 10, wherein preconditioning further comprises removing a background trend in amplitude from the integrated data by applying a filter to remove the background trend.

12. The method of claim 1, wherein generating AVO data comprises formulating the intercept (A) and gradient (B) seismic data using a Shuey multi-term approximation, or Zoeppritz equations.

13. The method of claim 1, wherein generating the AVO crossplot for fluids to identify the initial AVO anomaly comprises crossplotting the intercept (A) and gradient (B) seismic data at a well or other chosen hydrocarbon location within the subsurface region.

14. The method of claim 13, wherein the other chosen hydrocarbon location comprises one or more seismic traces for analysis.

15. The method of claim 13, further comprising:
providing at least one fluid line on the AVO crossplot; and
designating data on the AVO crossplot as anomalous or non-anomalous features with respect to the at least one fluid line.

16. The method of claim 15, wherein the at least one fluid line comprises one or more fluid lines separating anomalous and non-anomalous hydrocarbon bearing features from other hydrocarbon bearing features or non-hydrocarbon bearing features.

17. The method of claim 16, wherein the non-hydrocarbon bearing features are wet sands and/or wet shales and the hydrocarbon bearing features are hydrocarbon bearing sands.

18. The method of claim 1, wherein expanding the initial AVO anomaly using the lithology prediction data comprises:
creating fluid prediction data comprising an initial seismic dataset including non-anomalous reference points of seismic data for the subsurface region;
analyzing each point of the seismic data, trace-by-trace, to determine if each point falls within an anomalous zone for a hydrocarbon bearing feature on the AVO crossplot;
assigning a hydrocarbon value for each point determined to fall within the anomalous zone; and
expanding the fluid prediction data along the seismic trace for each point determined to fall within the anomalous zone.

19. The method of claim 18, wherein expanding the fluid prediction data comprises:
identifying one or more hydrocarbon-water contacts with an individual time sample; and
inputting the one or more hydrocarbon-water contacts as horizons that limit the expansion of the fluid prediction data.

20. The method of claim 18, wherein assigning the hydrocarbon value for each point and expanding the fluid prediction model are iteratively performed in a forward and a reverse direction with respect to the seismic trace.

21. A non-transitory, tangible, computer-readable storage medium having embodied thereon a computer program configured, when executed by a processor, for generating seismic fluid prediction data for a subsurface region, the medium comprising one or more code segments configured to:
precondition seismic data for amplitude-versus-offset (AVO) analysis;
generate seismic AVO attribute data for the subsurface region, including creating intercept (A) and gradient (B) seismic data using two or more angle stacks of seismic data;
generate lithology prediction data with the two or more angle stacks of seismic data or with the intercept (A) and gradient (B) seismic data;
generate an AVO crossplot for fluids to identify an initial AVO anomaly; and
expand the initial AVO anomaly using the lithology prediction data, thereby generating seismic fluid prediction data for the subsurface region; wherein expanding the initial AVO anomaly using the lithology prediction data comprises reversing a negative fluid prediction based on the initial AVO anomaly for a point indicated by the lithology prediction data to belong to the same lithology as a point having a positive fluid prediction.

22. The non-transitory tangible computer-readable storage medium of claim 21, further comprising one or more code segments configured to process two or more angle-stacks of seismic data.

23. The non-transitory tangible computer-readable storage medium of claim 21, wherein the one or more code segments configured to precondition seismic data comprises one or more code segments configured to:
spectral broaden the seismic data;
amplitude scale the seismic data to fit an AVO model of interest; and
rotate the seismic data to quadrature phase.

24. The non-transitory tangible computer-readable storage medium of claim 21, wherein the one or more code segments configured to precondition seismic data comprises one or more code segments configured to:
spectral shape the seismic data, wherein spectral shaping the seismic data comprises spectral shaping the seismic data to boost low frequency content, including:
estimating a seismic wavelet of the seismic data; and
applying a filter to move an amplitude spectrum of the seismic data to an earth model;
amplitude scale the seismic data for each angle stack to fit an AVO model of interest; and
rotate the seismic data to quadrature phase.

25. The non-transitory tangible computer-readable medium of claim 21, wherein the one or more code segments configured to precondition seismic data further comprises one or more code segments configured to:
spectrally whiten the seismic data to equalize amplitudes of the seismic data at all frequencies of the seismic data, wherein spectrally whitening the seismic data comprises:
estimating a seismic wavelet of the seismic data;
applying a filter to equalize amplitudes of the seismic data at all frequencies of the seismic data;
integrating the spectrally whitened data along time domain or depth domain for each trace; and
amplitude scaling the seismic data for each angle stack to fit an AVO model of interest.

26. The non-transitory tangible computer-readable medium of claim 21, wherein the one or more code segments configured to generate the AVO crossplot for fluids to identify the initial AVO anomaly comprises one or more code segments configured to crossplot the intercept (A) and gradient (B) seismic data at a well or other chosen hydrocarbon location within the subsurface region.

27. The non-transitory tangible computer-readable medium of claim 26, further comprising one or more code segments configured to:
provide at least one fluid line on the AVO crossplot; and
designate data on the AVO crossplot as anomalous or non-anomalous features with respect to the at least one fluid line.

28. The non-transitory tangible computer-readable medium of claim 27, wherein the at least one fluid line comprises one or more fluid lines separating anomalous and non-anomalous hydrocarbon bearing features from other hydrocarbon bearing features or non-hydrocarbon bearing features.

29. The non-transitory tangible computer-readable medium of claim 28, wherein the non-hydrocarbon bearing features are wet sands and/or wet shales and the hydrocarbon bearing features are hydrocarbon bearing sands.

30. The non-transitory tangible computer-readable medium of claim 21, wherein the one or more code segments to expand the initial AVO anomaly using the lithology prediction data comprises one or more code segments configured to:
create fluid prediction data comprising an initial seismic dataset including non-anomalous reference points of seismic data for the subsurface region;
analyze each point of the seismic data, trace-by-trace, to determine if each point falls within an anomalous zone for a hydrocarbon bearing feature on the AVO crossplot;
assign a hydrocarbon value for each point determined to fall within the anomalous zone; and
expand the fluid prediction data along the seismic trace for each point determined to fall within the anomalous zone.

31. The non-transitory tangible computer readable medium of claim 30, wherein assigning the hydrocarbon value for each point and expanding the fluid prediction model are iteratively performed in a forward and a reverse direction with respect to the seismic trace.

32. The non-transitory tangible computer readable medium of claim 30, wherein expanding the fluid prediction data comprises identifying one or more hydrocarbon-water contacts with an individual time sample; and inputting hydrocarbon-water contacts as horizons that limit the expansion of the fluid prediction data.

33. A method for producing hydrocarbons from a subsurface region, comprising:
generating seismic fluid prediction data for a subsurface region, wherein generating seismic fluid prediction data includes:
preconditioning seismic data for amplitude-versus-offset (AVO) analysis, using a computer;
generating, using the computer, seismic AVO attribute data for the subsurface region, including creating intercept (A) and gradient (B) seismic data using two or more angle stacks of seismic data;
generating, using the computer, lithology prediction data with the two or more angle stacks of seismic data or with the intercept (A) and gradient (B) seismic data;
generating, using the computer, an AVO crossplot for fluids to identify an initial AVO anomaly; and
expanding the initial AVO anomaly using the lithology prediction data, thereby generating seismic fluid prediction data for the subsurface region; wherein expanding the initial AVO anomaly using the lithology prediction data comprises reversing a negative fluid prediction based on the initial AVO anomaly for a point indicated by the lithology prediction data to belong to the same lithology as a point having a positive fluid prediction;
controlling production of a hydrocarbon bearing asset within the subsurface region based on the seismic fluid prediction data; and
producing hydrocarbons from the hydrocarbon bearing asset.

34. The method of claim 33, wherein controlling production of the hydrocarbon bearing asset includes optimizing well location or well production.

35. The method of claim 33, further comprising using the seismic fluid prediction data for spatially identifying fluids for transformation with one or more equations in a seismic reflectivity and rock physics inversion to determine rock properties.

36. The method of claim 1, wherein, in expanding the initial AVO anomaly using the lithology prediction data: a positive hydrocarbon prediction based on the AVO crossplot is expanded as designated by the lithology prediction data.

37. The method of claim 36, wherein expanding a positive hydrocarbon prediction comprises:
(a) finding a time sample on a seismic trace i having a positive hydrocarbon prediction based on the AVO crossplot;
(b) analyzing successive time samples along the seismic trace until a time sample i+M is found with a negative hydrocarbon prediction based on the AVO crossplot; and
(c) if the lithology prediction is the same for time samples i+M and i+M−1, changing the seismic fluid prediction for time sample i+M to positive for hydrocarbons.

38. The method of claim 37, further comprising:
(d) populating time samples i+M+1 and beyond with positive hydrocarbon predictions until a lithology prediction change occurs.

39. The method of claim 38, further comprising reversing direction of analysis along the trace, and repeating steps (a)-(d).

40. The method of claim 1, wherein well data are used to generate an empirically driven linear combination of the two or more angle stacks of seismic data or the intercept (A) and gradient (B) seismic data to generate lithology prediction data.

41. The method of claim 1, wherein well data are used to generate an empirically driven nonlinear combination of the two or more angle stacks of seismic data or the intercept (A) and gradient (B) seismic data to generate lithology prediction data.

* * * * *